United States Patent
Rossi et al.

(10) Patent No.: US 9,575,652 B2
(45) Date of Patent: Feb. 21, 2017

(54) INSTANTIABLE GESTURE OBJECTS

(75) Inventors: Jacob S. Rossi, Seattle, WA (US); Justin E. Rogers, Redmond, WA (US); Raju Ramanathan, Redmond, WA (US); Stephen H. Wright, Bothell, WA (US); Charu Chandiram, Redmond, WA (US); Matthew A. Rakow, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 250 days.

(21) Appl. No.: 13/436,877

(22) Filed: Mar. 31, 2012

(65) Prior Publication Data

US 2013/0263029 A1    Oct. 3, 2013

(51) Int. Cl.
*G06F 3/0488* (2013.01)
*G06F 3/01* (2006.01)
(Continued)

(52) U.S. Cl.
CPC ......... G06F 3/04883 (2013.01); G06F 9/4443 (2013.01); *G06F 3/01* (2013.01);
(Continued)

(58) Field of Classification Search
CPC .............. G06F 3/01; G06F 9/44; G06F 3/017; G06F 3/04883; H04N 1/00411
(Continued)

(56) References Cited

U.S. PATENT DOCUMENTS 5,592,566 A   1/1997  Pagallo et al.
5,784,504 A   7/1998  Anderson et al.
(Continued)

FOREIGN PATENT DOCUMENTS

CN   201266371   6/2007
CN   101959051   1/2011
(Continued)

OTHER PUBLICATIONS

Back to the Code, "JavaScript Touch and Gesture Events iPhone and Android", Oct. 25, 2009, retrieved from the Internet URL<http://backtothecode.blogspot.com/2009/10/javascript-touch-and-gesture-events.html/>, p. 1-35.*

(Continued)

*Primary Examiner* — Ajay Bhatia
*Assistant Examiner* — Mong-Shune Chung
(74) *Attorney, Agent, or Firm* — Timothy Churna; Dan Choi; Micky Minhas

(57) ABSTRACT

Instantiable gesture object techniques are described in which native gesture functionality is abstracted to applications using a script-based recognition interface. Gesture objects may be instantiated for different interaction contexts at the direction of applications programmed using dynamic scripting languages. Gesture objects can be configured to designate particular touch contacts and/or other inputs to consider for gesture recognition and a target element of content to which corresponding recognized gestures are applicable. After creation, gesture objects manage gesture processing operations on behalf of the applications including creating recognizers with the native gesture system, feeding input data for processing, and transforming raw gesture data into formats appropriate for the application and/or a target element. Accordingly, script-based applications may use the gesture objects to offload processing tasks associated with gesture recognition and take advantage of native gesture functionality.

20 Claims, 6 Drawing Sheets

(51) Int. Cl.
  *H04N 1/00* (2006.01)
  *G06F 9/44* (2006.01)
(52) U.S. Cl.
  CPC .............. *G06F 3/017* (2013.01); *G06F 9/44* (2013.01); *H04N 1/00411* (2013.01)
(58) Field of Classification Search
  USPC ........................................................ 715/764
  See application file for complete search history.

(56) References Cited

U.S. PATENT DOCUMENTS

| | | | |
|---|---|---|---|
| 5,805,167 | A | 9/1998 | van Cruyningen |
| 6,310,610 | B1 | 10/2001 | Beaton et al. |
| 6,643,824 | B1 | 11/2003 | Bates et al. |
| 7,411,575 | B2 | 8/2008 | Hill et al. |
| 7,797,630 | B2 | 9/2010 | Kashi |
| 7,932,896 | B2 | 4/2011 | Westerman |
| 8,469,810 | B2 | 6/2013 | Nakanishi et al. |
| 9,335,913 | B2 | 5/2016 | Stephenson et al. |
| 2002/0056575 | A1 | 5/2002 | Keely et al. |
| 2003/0037181 | A1* | 2/2003 | Freed ........................... 709/328 |
| 2007/0115264 | A1 | 5/2007 | Yu et al. |
| 2007/0177804 | A1 | 8/2007 | Elias |
| 2008/0036743 | A1 | 2/2008 | Westerman |
| 2008/0052945 | A1* | 3/2008 | Matas et al. ..................... 34/173 |
| 2008/0297482 | A1 | 12/2008 | Weiss |
| 2009/0225038 | A1 | 9/2009 | Bolsinga et al. |
| 2009/0225039 | A1 | 9/2009 | Williamson et al. |
| 2009/0271723 | A1 | 10/2009 | Matsushima et al. |
| 2009/0284488 | A1 | 11/2009 | Sip |
| 2009/0292989 | A1 | 11/2009 | Matthews et al. |
| 2009/0293007 | A1 | 11/2009 | Duarte et al. |
| 2009/0313567 | A1 | 12/2009 | Kwon et al. |
| 2010/0017732 | A1 | 1/2010 | Matsushima et al. |
| 2010/0020025 | A1 | 1/2010 | Lemort et al. |
| 2010/0042933 | A1 | 2/2010 | Ragusa |
| 2010/0141589 | A1 | 6/2010 | Hoover |
| 2010/0185681 | A1 | 7/2010 | Han et al. |
| 2010/0235118 | A1 | 9/2010 | Moore et al. |
| 2010/0289740 | A1 | 11/2010 | Kim et al. |
| 2011/0072394 | A1 | 3/2011 | Victor |
| 2011/0074710 | A1 | 3/2011 | Weeldreyer et al. |
| 2011/0138355 | A1 | 6/2011 | Gutz et al. |
| 2011/0167336 | A1 | 7/2011 | Aitken et al. |
| 2011/0181526 | A1 | 7/2011 | Shaffer et al. |
| 2011/0304541 | A1 | 12/2011 | Dalal |
| 2012/0131488 | A1 | 5/2012 | Karlsson et al. |
| 2012/0249422 | A1* | 10/2012 | Tse et al. ....................... 345/158 |
| 2013/0024819 | A1* | 1/2013 | Rieffel et al. ................. 715/848 |
| 2013/0120280 | A1* | 5/2013 | Kukulski ....................... 345/173 |
| 2013/0191757 | A1* | 7/2013 | Smith et al. ................... 715/748 |
| 2013/0254648 | A1* | 9/2013 | Amacker et al. ............. 715/234 |
| 2013/0293504 | A1* | 11/2013 | Heinrich ....................... 345/173 |
| 2014/0137029 | A1 | 5/2014 | Stephenson et al. |
| 2016/0246471 | A1 | 8/2016 | Stephenson et al. |

FOREIGN PATENT DOCUMENTS

| | | |
|---|---|---|
| CN | 102193626 | 9/2011 |
| CN | 102236413 | 11/2011 |
| EP | 1148411 | 10/2001 |
| EP | 2112594 | 10/2009 |
| EP | 2354930 | 8/2011 |
| WO | WO-2009142871 | 11/2009 |

OTHER PUBLICATIONS

Garsiel, "How browsers work", Feb. 20, 2010, retrieved from the Internet URL<https://web.archive.org/web/20100220000649/http://taligarsiel.com/Projects/howbrowserswork1.htm#The_rendering_engine/>, p. 1-25.*
TechNet, "SID vs. GUID", Dec. 22, 2010, retrieved from the Internet URL <https://web.archive.org/web/20101222210635/http://technet.microsoft.com/en-us/library/cc961625.aspx/>, p. 1-2.*
TomTom, "What are pinned objects?", Mar. 25, 2010, retrieved from the Internet URL <https://web.archive.org/web/20100325114656/http://stackoverflow.com/questions/2490912/what-are-pinned-objects/>, p. 1-5.*
"Non-Final Office Action", U.S. Appl. No. 13/095,495, (Jan. 24, 2013), 15 pages.
"PCT Search Report and Written Opinion", Application No. PCT/US2012/035314, (Nov. 30, 2012), 8 pages.
"Safari Web Content Guide", Retrieved at http://developer.apple.com/library/ios/#DOCUMENTATION/AppleApplications/Reference/SafariWebContent/HandlingEvents/HandlingEvents.html>>, Retrieved Date: Apr. 9, 2012, pp. 118.
"Javascript UI Gesture Recognizer for Mobile Safari", Retrieved at <<http://web.bogdanteodoru.com/javascript/ui-gesture-recognizer-for-mobile-safari/>>, Retrieved Date: Apr. 9, 2012, pp. 3.
"Multitouch Input", Retrieved from: <http://msdn.microsoft.com/en-us/library/dd894494(VS.95).aspx> on Dec. 29, 2010, (Sep. 13, 2010), 4 pages.
Hodges, Steve et al., "ThinSight: Versatile Multi-touch Sensing for Thin Form-factor Displays", In Proceedings of UIST 2007, Available at <http://citeseerx.ist.psu.edu/viewdoc/download?doi=10.1.1.137.2342&rep=rep1&type=pdf>,(Oct. 10, 2007), 10 pages.
"International Search Report", Mailed Date: Jul. 8, 2013, Application No. PCT/US2013/031809, Filed Date: Mar. 15, 2013, pp. 9.
Yeasin, et al.,"Dynamic Hand Gesture Understanding—A New Approach", Proceedings of 1999 IEEE International Conference on Acoustics, Speech and Signal Processing, vol. 6, Mar. 15-19, 1999, pp. 3073-3076.
Schlenzig, et al.,"Vision Based Hand Gesture Interpretation Using Recursive Estimation", Conference Record of the Twenty-Eighth Asilomar Conference on Signals, Systems and Computers, vol. 2, Oct. 31-Nov. 2, 1994, pp. 1267-1271.
Bhuyan, et al.,"A Framework for Hand Gesture Recognition with Applications to Sign Language", 2006 Annual IEEE India Conference, Sep. 2006, pp. 6.
"Final Office Action", U.S. Appl. No. 13/095,495, (Jul. 5, 2013), 15 pages.
"International Search Report and Written Opinion", Application No. PCT/US2013/069592, Jan. 27, 2014, 10 pages.
"Extended European Search Report", EP Application No. 127764243.3, Sep. 4, 2014, 7 pages.
"Foreign Office Action", CN Application No. 201280020262.3, Jul. 15, 2014, 13 pages.
"Non-Final Office Action", U.S. Appl. No. 13/095,495, Aug. 8, 2014, 14 pages.
"Final Office Action", U.S. Appl. No. 13/674,238, May 18, 2015, 21 pages.
"Foreign Office Action", CN Application No. 201380018255.4, Jun. 22, 2016, 17 pages.
"Extended European Search Report", EP Application No. 13768893.3, Oct. 13, 2015, 7 pages.
"Notice of Allowance", U.S. Appl. No. 13/674,238, Jan. 11, 2016, 8 pages.
Kenny,"UIGestureRecognizer—iPhone Development Wiki", Retrieved From <<http://iphonedevwiki.net/index.php?title=UIGestureRecognizer&oldid=319>>, Oct. 31, 2009, 3 pages.
"Foreign Notice of Allowance", CN Application No. 201280020262.3, Mar. 3, 2015, 3 Pages.
"Non-Final Office Action", U.S. Appl. No. 13/674,238, Jan. 15, 2015, 16 pages.

* cited by examiner

INSTANTIABLE GESTURE OBJECTS

BACKGROUND

The number and types of gestures that are supported by computing devices as a way for users to interact with content is ever increasing. Users may expect supported gestures to be available for various different applications and content interactions throughout the user experience. Traditionally, though, natively supported gesture functionality may require complex configuration, which makes it difficult or cost prohibitive for some developers to incorporate gestures in their applications. Additionally, native gesture functionality in existing systems may be limited or entirely unavailable for "modern" applications and/or content that employ dynamic scripting languages, such as JavaScript and HTML.

SUMMARY

Instantiable gesture object techniques are described in which native gesture functionality is abstracted to applications using a script-based recognition interface. Gesture objects may be instantiated for different interaction contexts at the direction of applications programmed using dynamic scripting languages. Gesture objects can be configured to designate particular touch contacts and/or other inputs to consider for gesture recognition and a target element of content to which corresponding recognized gestures are applicable. After creation, gesture objects manage gesture processing operations on behalf of the applications including creating recognizers with the native gesture system, feeding input data for processing, and transforming raw gesture data into formats appropriate for the application and/or a target element. Accordingly, script-based applications may use the gesture objects to offload processing tasks associated with gesture recognition and take advantage of native gesture functionality.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Traditionally, natively supported gesture functionality provided by a platform may require complex configuration, which makes it difficult or cost prohibitive for some developers to incorporate gestures in their applications. Additionally, native gesture functionality in existing platforms may be unavailable for applications that employ dynamic scripting languages, such as JavaScript and HTML.

Instantiable gesture object techniques are described in which native gesture functionality is abstracted to applications using a script-based recognition interface. Gesture objects may be instantiated for different interaction contexts at the direction of applications programmed using dynamic scripting languages. Gesture objects can be configured to designate particular touch contacts and/or other inputs to consider for gesture recognition and a target element of content to which corresponding recognized gestures are applicable. After creation, gesture objects manage gesture processing operations on behalf of the applications including creating recognizers with the native gesture system, feeding input data for processing, and transforming raw gesture data into formats appropriate for the application and/or a target element. Accordingly, script-based applications may use the gesture objects to offload processing tasks associated with gesture recognition and take advantage of native gesture functionality.

In the following discussion, an example environment is first described that is operable to employ the instantiable gesture object techniques described herein. Example scenarios and procedures are then described, which may be employed in the example environment, as well as in other environments. Accordingly, the example scenarios and procedures are not limited to the example environment and the example environment may incorporate scenarios and procedures in addition to the examples described herein. Lastly, an example computing system is described that can be employed to implement instantiable gesture object techniques in one or more embodiments.

Operating Environment

Figure 1:
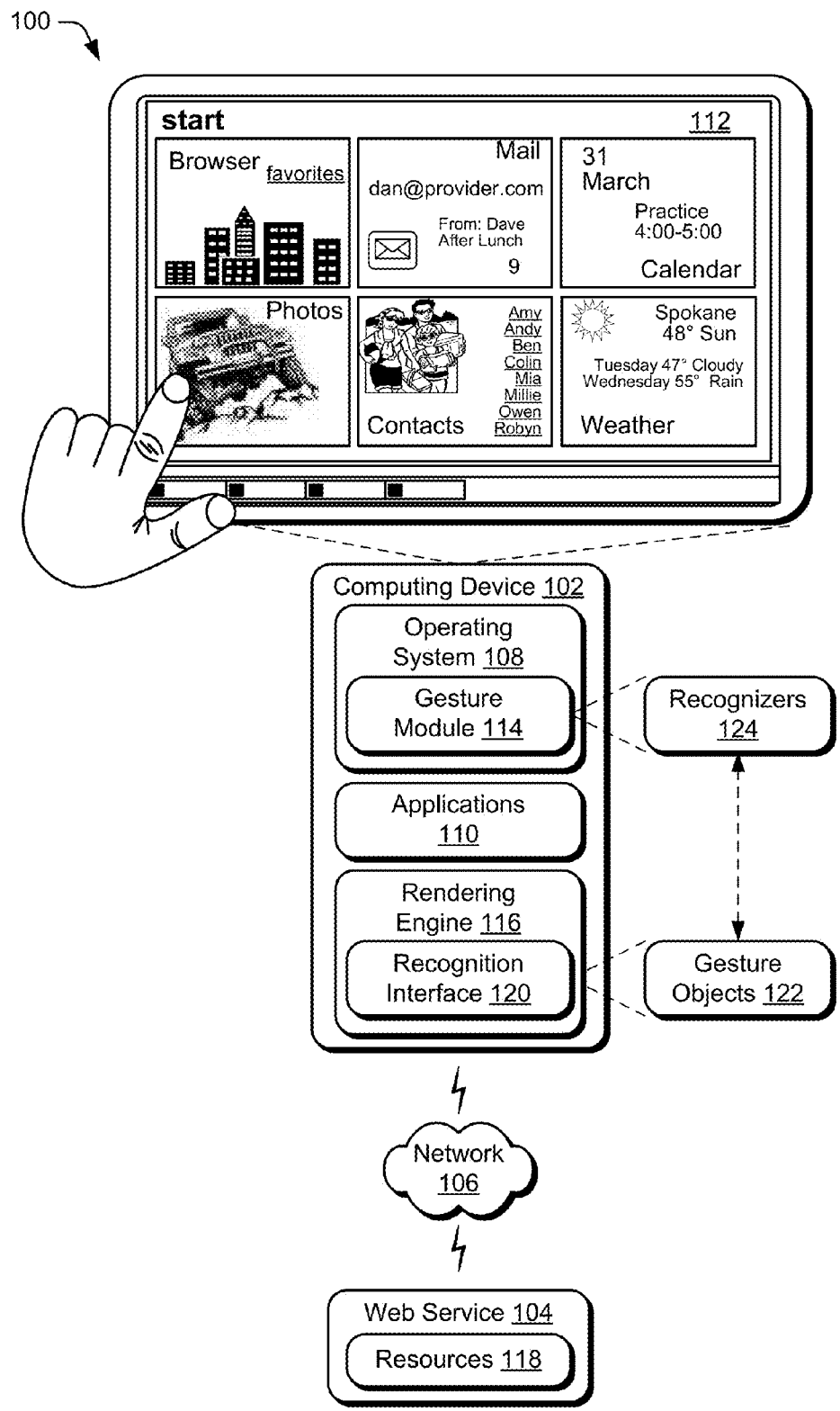
FIG. 1 is an illustration of an example environment that is operable to employ instantiable gesture object techniques described herein.

FIG. 1 is an illustration of an environment 100 in an example implementation that is operable to employ techniques described herein. The illustrated environment 100 includes a computing device 102 and a web service 104 that are communicatively coupled via a network 106. The computing device 102 and the web service 104 may each be implemented by a wide range of computing devices.

For example, a computing device 102 may be configured as a computer that is capable of communicating over the network 106, such as a desktop computer, a mobile station, an entertainment appliance, a tablet or slate device, a surface computing device, a set-top box communicatively coupled to a display device, a mobile communication device (e.g., a wireless phone), a game console, and so forth. The computing device 102 may be configured as any suitable computing system and/or device that employ various processing systems, some additional examples of which are discussed in relation to the example system of FIG. 6.

The computing device 102 is further illustrated as including an operating system 108. Generally speaking, the operating system 108 is configured to abstract underlying functionality of the computing device 102 to applications 110 that are executable on the computing device 102. For example, the operating system 108 may abstract processing, memory, network, and/or display functionality of the computing device 102 such that the applications 110 may be written without knowing "how" this underlying functionality is implemented. The application 110, for instance, may provide data to the operating system 108 to be rendered and displayed by the display device without understanding how this rendering will be performed. The operating system 108 may provide various services, interfaces, and functionality that the applications 110 may invoke to take advantage of system features. A variety of applications 110 to provide a wide range of functionality to the computing device 102 are contemplated including but not limited to a browser to access and render webpages and/or other content, an office productivity application, an email client, games, a multimedia management program, device management software, and social networking applications, to name a few examples.

The operating system 108 may further provide services, interfaces, and functionality for different kinds of applications including "legacy" applications that may be written using statically compiled languages, such as C++, C# and "modern" applications that may be written using dynamic scripting languages that may be dynamically compiled at runtime, such as JavaScript, hypertext markup language revision 5 and/or cascading style sheets (HTML5/CSS), and extensible application mark-up language (XAML). Modern applications may operate through one or more runtime platforms supported by the operating system 108 that are configured to provide respective execution environments for corresponding applications. Runtime platforms provide a common set of features, routines, and functions for compatible applications thereby offloading coding of common tasks from application development. Thus, runtime platforms can facilitate portability of applications to different kinds of systems with little or no change to the dynamic script for the applications and/or without recompiling. Examples of runtime platforms include JAVA™ runtime environment (JRE), Adobe™ Flash™, Microsoft™ .NET framework, Microsoft Silverlight™, and WinRT™, to name a few examples.

In the depicted example, the computing device 102 includes or makes use of a display device 112 that may be configured to include a touchscreen/touch digitizer to enable touchscreen and gesture functionality. The computing device 102 may therefore include a display driver, gesture module 114, and/or other modules operable to provide touchscreen and gesture functionality enabled through touch capabilities of the display device 112. Accordingly, the computing device may be configured to recognize input and gestures that cause corresponding operations to be performed.

For example, a gesture module 114 may be implemented as component of the operating system 108 as depicted in FIG. 1. The gesture module 114 represents native functionality for support and recognition of gestures (e.g., a native gesture system) that may be made accessible to applications 110 via the operating system 108. For instance, the operating system 108 may provide one or more application programming interfaces (APIs) operable to invoke gesture recognition functionality. In particular, the gesture module 114 may be configured to recognize a touch input, such as a finger of a user's hand as on or proximate to the display device 112 of the computing device 102 using touchscreen functionality. A variety of different types of gestures may be recognized by the computing device including, by way of example and not limitation, gestures that are recognized from a single type of input (e.g., touch gestures) as well as gestures involving multiple types of inputs. For example, can be utilized to recognize single-finger gestures and bezel gestures, multiple-finger/same-hand gestures and bezel gestures, and/or multiple-finger/different-hand gestures and bezel gestures. Further, the gesture module 114 may be configured to detect and differentiate between gestures, touch inputs, camera-based input, a stylus input, and other different types of inputs. Moreover, various kinds of inputs obtained from different sources, including inputs obtained through a touchscreen, a mouse, touchpad, a camera, software or hardware keyboard, and/or hardware keys of a device (e.g., input devices), may be used in combination to cause corresponding device operations.

The computing device 102 is further depicted as including a rendering engine 116. The rendering engine 116 represents a component of the computing device 102 operable to handle various content rendering operations for display of content. For instance, the rendering engine 116 may process corresponding mark-up language content and output formatted content for display on the display device 112. In at least some embodiments, the rendering engine 116 is configured as a component of a browser that facilitates rendering of webpages and other resources 118 that may be obtained over the network 106 from the web service 104. Resources 118 can include any suitable combination of content and/or services typically made available over a network by one or more service providers. The rendering engine 116 may also be implemented as a standalone application or operating system component. The browser and other applications 110 of the computing device may invoke the rendering engine 116 to handle rendering of corresponding content items for the applications. For example, various kinds of "modern" applications that employ dynamic scripting languages may use functionality of the rendering engine 116 for processing and display of corresponding pages, documents, media, images, forms, user interfaces, and/or other types of application content.

To implement instantiable gesture object techniques, the rendering engine 116 may be configured to include or otherwise make use of a recognition interface 120. The recognition interface 120 represent functionality that may be exposed to applications 110 via the rendering engine 116 to enable interaction with native functionality for support and recognition of gestures that is represented by the gesture module 114. Traditionally, direct configuration of gestures via the gesture module 114 may be complex and resource intensive. Moreover, native gesture functionality in existing systems may be limited or entirely unavailable for "modern" applications that employ dynamic scripting languages. Thus, in order to produce applications that take advantage of native gesture functionality, application developers traditionally maintain detailed knowledge of complex configuration management options provided via the gesture module 114 and/or may have to perform complex and/or static programming to invoke the functionally directly from application code. As described in detail herein, the recognition interface 120 may simplify application development by performing various gesture configuration, handling, and processing operations on behalf of applications. Thus, the recognition interface 120 offloads various processing and handling operations for gesture recognition from the applications, which relieves application developers from having to write code for these operations and/or have detailed knowledge of gesture configuration options.

In one approach, applications 110 may invoke the recognition interface 120 to instantiate gesture objects 122 for various interactions. Gesture objects 122 then automatically handle gesture recognition operations via the gesture module 114 on behalf of the applications. For example, the gesture objects 122 may be configured to communicate with the gesture module 114 on behalf of applications to create appropriate recognizers 124 for different interactions and to feed input data to the recognizers 124 for gesture processing. The gesture objects 122 generally speaking are script-based representations of and interfaces for manipulation of the underlying recognizers and native gesture functionality. A gesture object 122 and corresponding recognizer 124 may be created for each particular interaction context. An interaction context as used herein refers to a particular input or group of inputs (e.g., touch contacts, stylus input, pointer input, camera input, etc.) that is tracked by the gesture module 114 for gesture recognition.

The recognizers 124 are components/objects created for the native gesture system that are configured to track inputs for different interaction contexts, map the inputs to a library of supported gestures, detect when particular gestures occur, and fire appropriate events for gesture recognition. Thus, the recognizers 124 represent functionality to handle processing at the system level for gesture recognition in different contexts. The recognizers 124 understand how to invoke the native gesture functionality for a set of inputs using designated system formats and protocols. Recognizers 124 may be configured to detect a variety of supported gestures examples of which include, but are not limited to, tap, hold, rotate, scale, zoom, pan, and translate gestures.

The gesture object 122 facilitates processing of raw gesture events generated by the recognizers 124 on behalf of the application. The gesture object 122 may facilitate translation of information between system formats used by the recognizers and script-based formats understandable by applications programmed using dynamic scripting languages. This may include detecting events fired by the recognizers, formatting gesture information/events for a particular application, transforming raw gesture data into a coordinate space of an application and/or element associated with an interaction context/gesture object, and so forth, details of which can be found in the following discussion.

Having described an example operating environment, consider now a discussion of some example implementation details regarding instantiable gesture objects in one or more embodiments.

Instantiable Gesture Object Details

Figure 2:
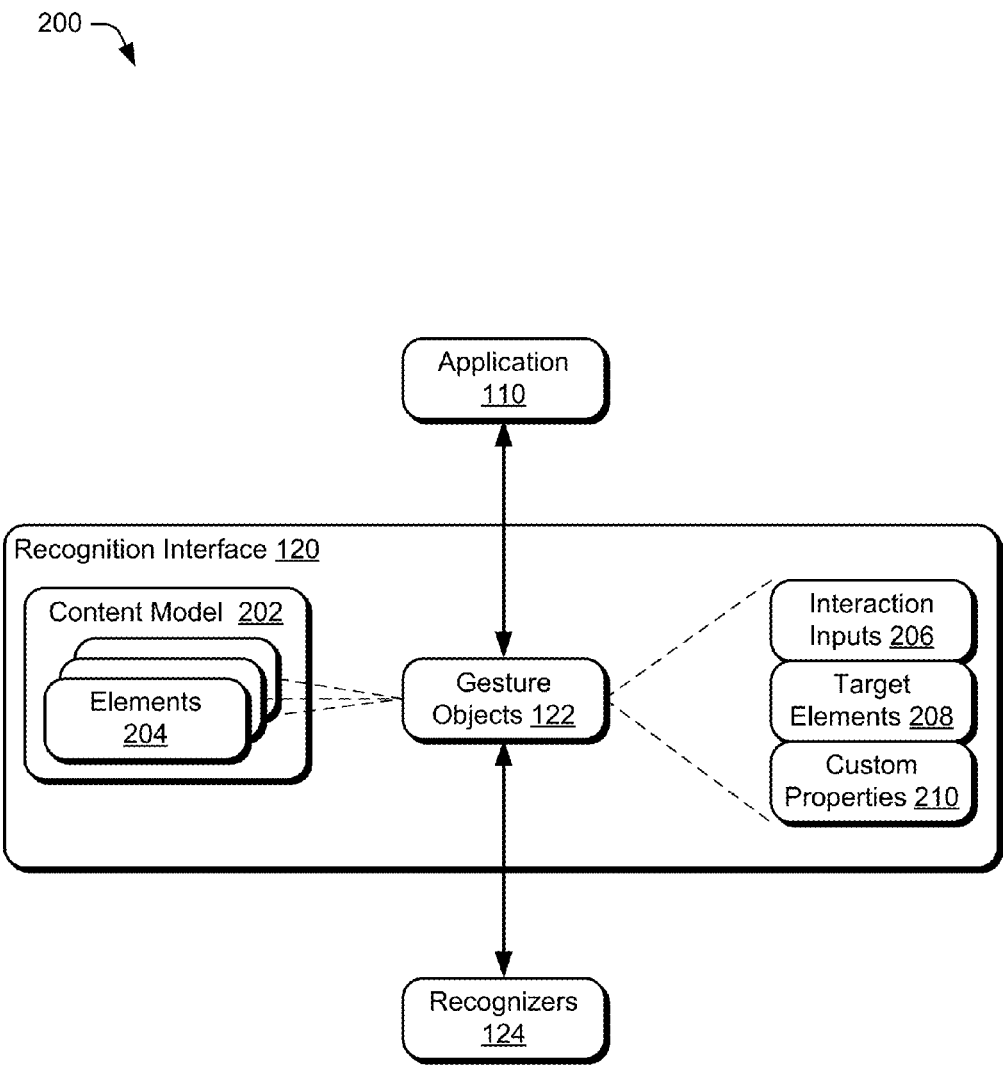
FIG. 2 depicts a scenario that depicts details of an example gesture object in accordance with one or more embodiments.

To further illustrate, consider now FIG. 2, which depicts generally at 200 an example scenario in which a recognition interface 120 is invoked to instantiate gesture objects 122 to handle gesture recognition of behalf of an application 110. Content that is rendered for an application by the rendering engine 116 (or otherwise) may be represented according to a corresponding content model 202. The content model 202 is a hierarchal representation of the structure of a document, page, or other application content. The content model enables applications that consume content to reference and manipulate various elements 204 contained in the content. Elements 204 may include for example, images, controls, text, menus, graphics, and so forth included with the content. In one particular example, a document object model (DOM) may be employed by an application. The DOM is a standard convention for representing and interacting with elements in pages for a browser (or other application). The DOM of a page can be built by a browser and used to reference, modify, apply effects, and/or otherwise manipulate elements 204 contained in a webpage. Content for other applications may also be configured in accordance with the DOM to represent the elements 204 of corresponding pages, files, and/or documents. Other kinds of content models 202 may also be employed in one or more embodiments.

As represented in FIG. 2, an application may interact with the recognition interface 120 to direct the recognition interface 120 to create gesture objects 122 for one or more interaction contexts. Gesture objects 122 then operate to create and wrap corresponding recognizers 124 associated with native gesture functionality of the computing device 102. A gesture object feeds input data to the wrapped recognizer and receives raw gesture recognition data/events back from the recognizer based on processing performed via the recognizer and/or gesture module 114. Gesture objects 122 may also be mapped to particular elements 204 based on the corresponding content model 202. In this way, an application is able to explicitly specify an element to which results of gesture processing for a gesture object will be applied. Moreover, an application may be able to specify a collection of distinct items as an element for the purposes of gesture application. This is contrast to traditional techniques in which elements to which a gesture applies are inferred heuristically using hit testing or other comparable selection techniques on individual items.

Gesture Objects

In particular, gesture objects 122 are illustrated in FIG. 2 as including interaction inputs 206, target elements 208, and custom properties 210 that may be set by an application to generate an object for a given interaction context. The interaction inputs 206 (also referred to as pointers) are inputs such as touch contacts, pointer positions/movements, stylus input, mouse inputs and/or other inputs that are tracked for the interaction context. A gesture object 122 may be configured to include one or more individual inputs/contact, e.g., pointers. Gesture objects may include multiple pointers of the same type from the same input source and/or combinations of different types of pointers from different input sources. Inclusion of inputs/contacts in a gesture object 122 causes these inputs/contacts to be considered for gesture detection. The target elements 208 represent elements within the content model 202 to which gesture objects 122 are mapped. For instance, elements in a DOM representation of content may be specified as targets for gesture objects. An individual element may be defined to contain one or more individual components/items of a user interface, page, or document that is being rendered. Designating a target element 208 for a gesture object 122 causes gesture events generated in relation to the gesture object 122 to be explicitly directed to the designated element. A single target element or multiple target elements may be designated for a gesture object to enable a variety of different interaction scenarios/gestures. Moreover, because the element or elements are known in advance, raw gesture data obtained via the gesture module 114 and/or recognizers 124 can be formatted for particular elements. Thus, the gesture object may supply formatted gesture data to an application that may be applied to a corresponding element with little or no additional processing at the application level. Additionally, custom properties 210 may be provided to enable extensions and customization of gesture object behaviors and to facilitate lifetime management, details of which are discussed later in this document.

In at least some embodiments, the gesture objects 122 are implemented in a script-based programming language, such as JavaScript, as a built-in object type available to developers. The gesture objects 122 include the interaction inputs 206 and target elements 208 as properties of the object. Developers may use methods on the object to set the properties and cause the recognition interface 120 to instantiate an appropriate object for a given interaction context. These methods enable the developer/application to add touch contacts and/or other inputs to an object and to specify target elements in the DOM or another content model. Developers may also set custom properties 210 via exposed methods in a comparable manner. In one approach, the recognition interface 120 may be configured as an application programming interface that exposes methods used to define and create gesture objects 122 for gesture recognition.

By way of example and not limitation, the following pseudo-code represents but one script-based implementation of gesture objects and methods suitable for the described techniques:

```
var g = new Gesture( )        // creates a gesture object
g.target = element            // specifies the element to receive gesture
                                 events
g.addPointer(pointerId)       // adds a contact/input to the object/recognizer
g.removePointer(pointerId)    // removes a contact/input
g.stop( )                     // terminates gesture processing
```

Per the foregoing, a gesture objects may be created using a built-in object type that is supported by the recognition interface 120. Elements and interaction inputs (e.g., contacts/inputs) may be specified as properties of the created object. Contacts/inputs may be removed by the remove method so that the contacts/inputs are no longer considered as part of the gesture processing. The stop method enables termination of processing on demand. The stop method removes contacts/inputs from the object, terminates processing, fires an end event for the gesture, and resets the object/recognizer to prepare for another gesture. Otherwise, an object may persist and automatically clean it self-up in accordance with lifetime management techniques described below.

Thus, to start gesture events for a given interaction context an application may invoke the recognition interface 120 and specify a target element and one or more interaction inputs. This causes creation a corresponding gesture object 122 through the recognition interface 120. The bulk of processing for gesture recognition is then handled via the gesture object 122 on behalf of the application, including supplying input data to a recognizer, processing gesture event messages, transforming raw gesture data, and so forth. In effect, the application registers with the recognition interface 120 for gesture updates on particular inputs/contacts relative to a selected target element, e.g., the interaction context, and may then just wait for the recognition interface 120 to return pertinent information for the interaction context. For instance, the recognition interface 120 may supply gesture events/data for elements that is already transformed relative to a corresponding element as DOM events in the DOM for application content, or as comparable events appropriate to another content model employed by an application.

Consider an example in which a user selects an image with a touch of their index finger and drags the image across the display. Upon the initial selection of the image, the application may operate to form a corresponding gesture object 122 through the recognition interface 120 with the image as the target element 208 and the index finger touch as the interaction input 206. Now, the application itself no longer needs to monitor the changes in finger position (e.g., the drag) or supply such information to the recognition system. Instead, the gesture object 122 instantiated in this scenario automatically tracks the interaction input 206 on behalf of the application and feeds information regarding the changes in contact position to a recognizer 124, which may detect the corresponding drag gesture. Further, the gesture object 122 and/or recognition interface 120 also processes gesture event messages generated by the recognizer 124 and may supply these event messages to the application in accordance with a content model employed by the application.

Coordinate Transformation

As briefly discussed above, results of gesture processing may be pre-processed to transform the results specifically for a targeted element. The designation of target elements 208 for a gesture object 122 effectively makes the system element aware. As such, the recognition interface 120 is configured to transform a gesture detection result into the coordinate space associated with the element to which the gesture is targeted. Typically, a gesture result may be expressed as a delta between a previous state and a new state or as cumulative values relative to an initial state. If the raw delta or cumulative data for a gesture is supplied to the application, the application must do the work to transform the raw delta for a particular element. For instance, if the element has previously been rotated, the application must determine how to apply the gesture relative to the pre-existing rotation. In traditional systems that are not element aware, the developer has no choice but to handle these situations in their application code, which complicates development. On the other hand, explicitly defining target elements 208 for a gesture object 122 as per the techniques described herein enables the recognition interface 120 to track the state of an element. The element state may be updated based on applied gestures and the updated state is used to compute a delta for a subsequent recognized gesture (or gesture change) in the coordinate space defined for the element. Thus, each time a gesture is detected, the raw delta information provided by the gesture module 114 may be transformed into the appropriate coordinate space on behalf of the application. The application may therefore be able to directly apply the result to the corresponding element with little or no additional processing.

In at least some embodiments, applications may also explicitly specify a particular coordinate space into which gesture data is transformed. To do so, the application may set the target element and also set another designated and/or custom property of a gesture object configured to specify a coordinate space that may or may not correspond to the target element. This enable the application to select a coordinate space that may be different form the coordinate space of the target element to which the gesture events are fired. For instance, gesture data may be transformed into the global coordinate space of the page/document rather than the target element's. Even further, the application can define an arbitrary or global coordinate space transform for a gesture object, such that corresponding gesture data is transformed and reported as being in the defined coordinate space selected by the application.

Lifetime Management

The recognition interface 120 and gesture objects 122 may be further configured to implement a managed lifetime scheme that enables reuse of the objects, preserves the ability to access/reference objects having active interaction inputs 206, and controls automatic collection to clean-up the objects at appropriate times. Generally speaking, JavaScript and other script-based objects are created having a scope (e.g., functional or global) and may persist for the duration of the associated scope. The scope may relate to a particular function/module or for the lifetime of the page or application instance. The object may then recognize when it is no longer being used and automatically collect itself (e.g., removes itself and/or otherwise allows itself to be deleted).

To prevent gesture objects 122 that still have active interaction inputs 206 (e.g., contacts/inputs) from automatically collecting/removing themselves, the interaction inputs 206 for an object may be configured as pinning references. The pinning references keep the object alive so long as the interaction inputs 206 remain active. This may be the case even if the scope of the object is no longer valid (e.g., a function/module that defines the scope of an object has terminated). The target elements 208 for objects also may act as pinning references that keep respective objects alive until the target elements are cleared. Thus, the gesture objects 122 may persist as long as the interaction inputs 206 driving a gesture persist and gesture events may continue to be supplied via the gesture objects 122. When interaction inputs 206 are removed (e.g., a user removes their fingers from the display), a gesture object 122 may proceed to recognize that they are no longer in use and automatically collect itself. This occurs without the application having to manage the gesture objects 122 that are created on its behalf.

To enable continued access to gesture objects 122 during the lifetime, gesture events supplied by the recognition interface may include information that identifies and provides access to a corresponding gesture object. Thus, even if reference is lost to an object, the object identifying property contained in the events may be used to access the corresponding gesture object. Additionally, custom properties 210 may be set to carry custom information and even functions. For instance, a particular function to call each time an event is fired by an object may be specified via custom properties 210. In another example, a property may be configured to convey a list of contacts/input currently associated with a given object to the application. A variety of other examples are also contemplated.

As mentioned, gesture objects 122 may also be reused. Once an object is created and associated with interaction inputs 206 and target element 208, the object may persist as discussed above. While interaction inputs 206 associated with an object are active, the target element 208 remains the same. Additional interaction inputs 206 may be added to the object. Interaction inputs 206 may also be removed explicitly (using a remove method) or automatically when the contacts/input driving a gesture are complete (e.g., finger is lifted). Thus, the particular contacts/inputs considered for a gesture object 122 may change over the lifetime of the object. Once all the interaction inputs 206 are removed, the object may automatically reset. An object may also reset in response to an explicit stop as described above. Subsequently, different interaction inputs 206 that are applied to the same element may be added to the gesture object 122 to reuse the object. The gesture object 122 can also be associated with a different element so long as the object is not actively being used for a different element (e.g., a gesture is in progress).

Another feature of gesture objects is the ability for applications to seamlessly handle inertia processing. Inertia processing is used to simulate inertia when user interface elements are manipulated through gestures to provide natural interaction effects after a user lifts their fingers or otherwise concludes input driving a gesture. Thus, for a period of time after user interaction concludes, a manipulated element may coast to a stop, bounce off of a border, continue to scroll, and so forth. Inertia may be dependent upon the velocity of user interactions that trigger gestures, (e.g., how fast or slow a user pans, zooms, or rotates). The inertia processing continues for some time based upon the velocity and then may gradually stop. The inertia processing may be accomplished by setting a timer when the last contact/input used for the interaction concludes. While the timer is running, gesture events generated through inertia processing may continue to be supplied to the application as though the event were generated by direct interaction. Gesture events generated through inertia processing may be directed to the application and/or target elements in the same manner as gesture events generated through direct interaction.

Applications may be configured to detect when a mode change occurs from direct interaction to inertia processing. For example, a mode identifier may be included in gesture events and/or a notification message may be sent when contacts for a gesture conclude. Accordingly, applications may selectively use or ignore gesture events that are generated through inertia processing. For example, an application may simply ignore events associated with inertia processing, so that an element stops moving/reacting when direct user manipulation concludes. In addition or alternatively, an application can call the stop method "g.stop( )" discussed above to reset the gesture, which cuts off inertia processing and delivery of gesture events to the application.

Figure 3:
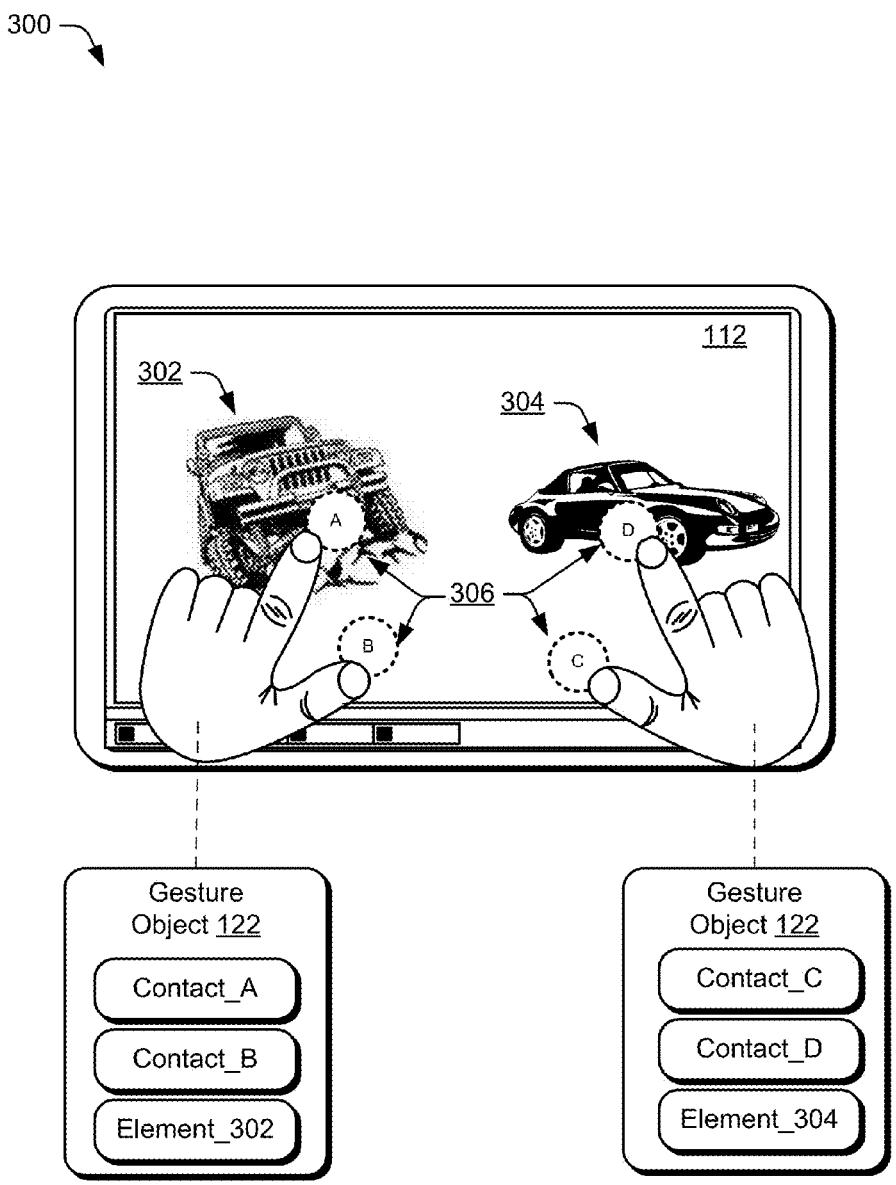
FIG. 3 depicts an example scenario in which multiple gesture objects are employed for gesture recognition.

FIG. 3 depicts generally at 300 an example interaction scenario that illustrates additional aspects of instantiable gesture object techniques described herein. In particular, the scenario of FIG. 3 depicts manipulation of a first element 302 and a second element 304 displayed in a user interface of a computing device 102. In this example, the elements are images of different vehicles. A plurality of interaction inputs 306 are also illustrated that are labeled using respective letters A through D. In this example, the interaction inputs 306 correspond to touch contacts of a user's hands with the display device 112. For this scenario, a different interaction context may be defined for interactions with each of the user's hands. Accordingly, a different gesture object 122 may be instantiated for each of the hands in the manner previously described.

As depicted in FIG. 3, a gesture object 122 corresponding to the user's left hand is configured to track contacts A and B, and is associated with the first element 302 as a target element. Another gesture object 122 corresponding to the user's right hand is configured to track contacts C and D, and is associated with the second element 304 as a target element. The different gesture objects 122 are concurrently active and may be managed/processed independently of one another. For instance, a pinch of the contacts A and B may be recognized as a zoom gesture that causes a zoom-in on the first element 302, while at the same time contact D is recognized as a select and hold gesture applied to the second element 304. In this example, contact C may be considered in connection with the second element 304 but may not contribute to the recognized select and hold gesture.

The use of multiple different gesture objects 122 to control different interactions concurrently enables a variety of different multi-touch input and multi-gesture scenarios. A variety of different contexts/gestures tracked by way of corresponding gesture objects 122 may be active at the same time. Each object may be used to track one or multiple individual contacts/inputs. Additionally, an individual contact may be added to multiple gesture objects at the same time and therefore may be considered concurrently for detection of multiple gestures.

Although, objects associated with different elements are depicted in FIG. 3, multiple different gesture objects 122 that track different gestures may be associated with the same element at the same time. For example, consider an example in which both hands depicted in FIG. 3 are applied to the first element 302. Different gesture objects 122 may still be produced in this example. However, here the target element for the different objects may be the same element. The different gesture objects 122 may be configured to drive different actions on the same element. For example, the left hand may perform a zoom gesture while the right hand performs a rotate gesture on the same element.

In another example, the left hand may be configured to rotate the element coarsely while the right hand performs fine rotation of the element. These different gestures may be detected and applied concurrently to the first element 302 via respective gesture objects 122. A variety of other examples of multi-touch and multi-gesture scenarios enabled through the use of one or more gesture objects 122 are also contemplated, including scenarios in which different input sources (e.g., touch, stylus, camera, mouse, etc.) and/or combinations of multiple input sources (e.g., touch and mouse, stylus and camera, touch and camera, etc.) are employed.

Having described some details regarding instantiable gesture objects, consider now some example procedures in accordance with one or more embodiments.

Example Procedures

The following discussion describes instantiable gesture object techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference may be made to the operating environment 100 and example scenarios 200 and 300 of FIGS. 2 and 3, respectively.

Figure 4:
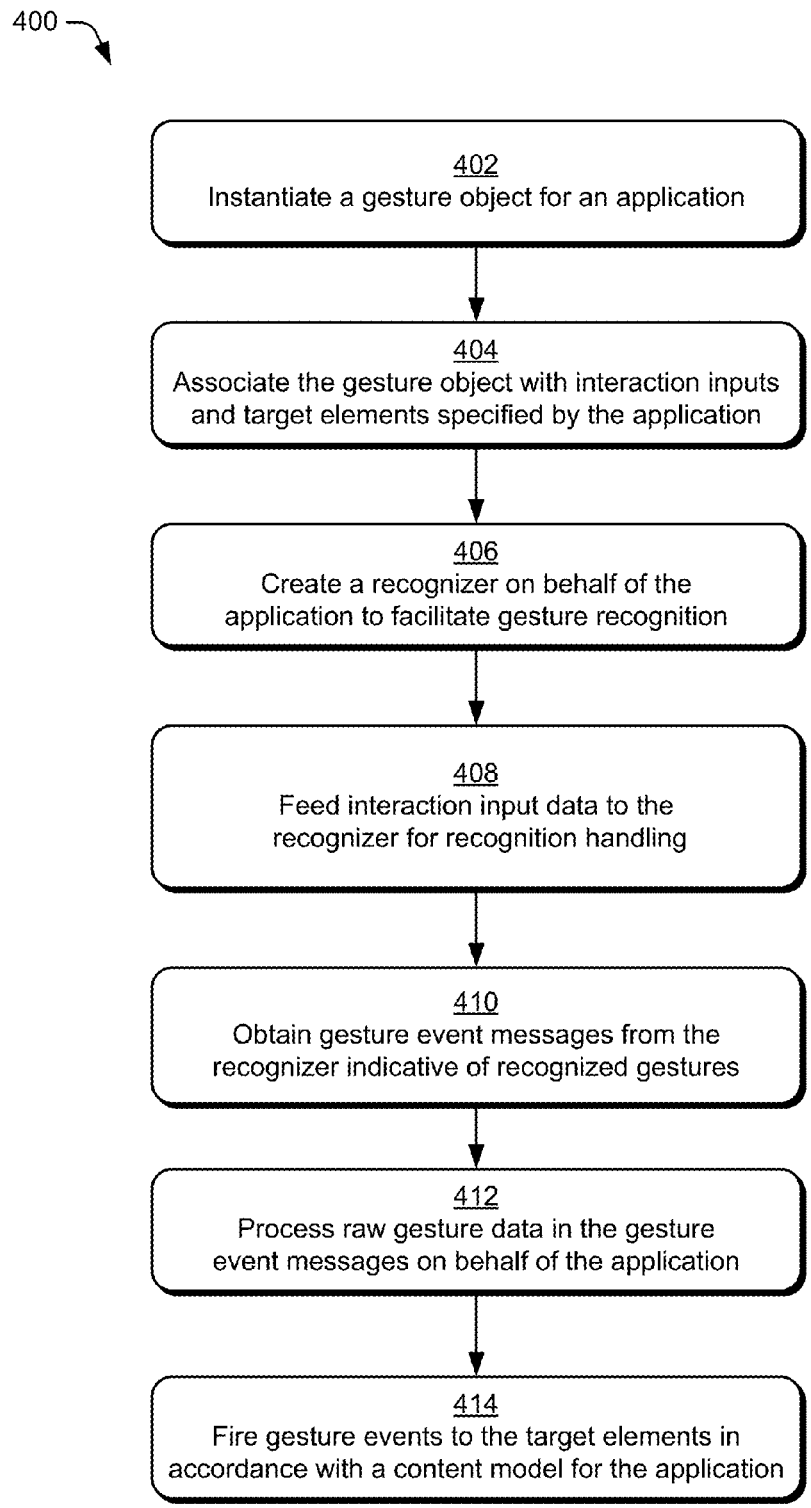
FIG. 4 is a flow diagram depicting an example procedure to instantiate gesture objects in accordance with one or more embodiments.

FIG. 4 depicts an example procedure 400 in which gesture objects 122 are employed to perform gesture recognition on behalf of an application. In at least some embodiments, the procedures may be performed by a suitably configured computing device, such as the example computing device 102 of FIG. 1 that includes or otherwise make use of a rendering engine 116 that implements a recognition interface 120.

A gesture object is instantiated for an application (block 402). For example, a rendering engine 116 may provide an interface that enables script-based applications that rely on the rendering engine 116 to invoke native gesture functionality of a computing device 102 and/or operating system 108. The interface enables applications written in dynamic scripting languages, such as JavaScript, to offload processing for gestures from the applications. To do so, the rendering engine 116 may instantiate gesture objects 122 as directed by the application. The gesture objects 122 are configured to handle operations for gesture recognition on behalf of the applications, as described previously.

The gesture object that is instantiated is associated with interaction inputs and target elements specified by the application (block 404). For example, properties of the gesture object 122 may be set to designated particular interaction inputs 206 and a target element 208 associated the object, as discussed above in relation to FIG. 2. The interaction inputs 206 added to an object may then be considered together for gesture recognition and any corresponding gestures recognized by the gesture module 114 may be directed explicitly to a target element 208 that is selected. Different interaction inputs 206 may be added and removed from an object at various times and the object itself may be reused for different interaction contexts.

A recognizer is then created on behalf of the application to facilitate gesture recognition (block 406). Interaction input data is then fed to the recognizer for recognition handling (block 408). As discussed previously, a recognizer 124 is a system level object/abstraction that facilitates gesture recognition via the native gesture system. Gesture objects 122 may be implemented to use a script-based format for interactions with modern applications 110 and each object may create a corresponding recognizer 124 that employs a native system format to invoke native gesture functionality. Gesture objects 122 then feed input data regarding interaction inputs to corresponding recognizers for processing. Given a set of interaction inputs 206 for an interaction context, the recognizer 124 manages tracking of these inputs and recognition of gestures through a gesture module 114. For instance, the interaction inputs 206 may be mapped to a library of gestures supported by the gesture module 114, as discussed previously.

Gesture event messages are obtained from the recognizer that are indicative of recognized gestures (block 410) and raw gesture data in the gesture event messages obtained from the recognizer is processed on behalf of the application (block 412). For example, in response to recognition of gestures using inputs supplied by a corresponding gesture object 122, a recognizer 124 may send gesture event messages for receipt by the gesture object 122. The gesture object 122 may obtain corresponding gesture event messages, which generally contain raw gesture data computed via the native gesture system. In accordance with techniques described herein, the gesture object 122 may cause processing upon the raw data to transform the data specifically for a particular target element and/or application. For example, raw gesture data may be transformed into a coordinate space corresponding to the target element defined by the gesture object 122 in the manner previously discussed. Thus, the application is relieved of having to perform such computations.

Gesture events are fired to the target elements in accordance with a content model for the application (block 414). The gesture events fired to the target elements contain processed gesture data that has been transformed for the application and/or target elements. Thus, the application may simply apply the gestures/actions that are conveyed via the gesture events to appropriate elements.

Figure 5:
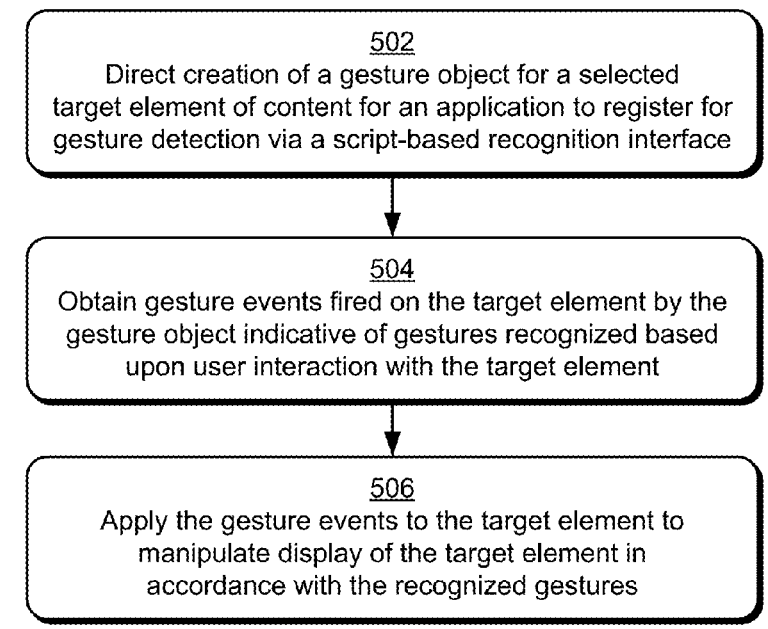
FIG. 5 is a flow diagram depicting another example procedure in which an application registers for gesture recognition in accordance with one or more embodiments.

FIG. 5 depicts an example procedure 500 in which an application registers interaction inputs for gesture recognition using gesture objects. In at least some embodiments, the procedure may be performed by a suitably configured application 110 of FIG. 1 that is configured to invoke a recognition interface 120 implemented via a rendering engine 116 of a computing device.

An application may direct creation of a gesture object for a selected target element of a corresponding content item to register for gesture recognition via a script-based interface (block 502). For example, an application programmed using a dynamic scripting language may interact with a recognition interface 120 exposed by a rendering engine 116 used to render content for the application. The interaction may cause the recognition interface 120 to instantiate a gesture object 122 for a given interaction context in the manner described previously. To define the interaction context, the application may use methods on the object to configure the object by setting various properties of the object. In general this involves specifying at least interaction inputs 206 and a target element 208 as described in relation to FIG. 2. The application may also set custom properties 210 to control behaviors and/or extend functionality of the gesture object 122. Examples of such customizations include, but are not limited to, triggering functions to call in response to particular gestures, designating particular kinds of gestures that are applicable to the context and/or that may be ignored, returning specified data/properties regarding gestures and/or inputs used to compute the gestures, providing configuration parameters and thresholds to control gestures, and so forth.

Gesture events are then obtained that are fired on the target element and are indicative of gestures recognized based upon user interaction with the target element (block 504) and the gesture events are applied to the target element to manipulate display of the target elements in accordance with the recognized gestures (block 506). As mentioned previously, the gesture objects 122 enable applications 110 to offload much of the workload for processing of gestures. Thus, after directing creation of objects per block 502, an application automatically begins to obtain gesture events for corresponding interaction contexts. This may occur without the application performing additional work to recognize the gestures. The application may simply incorporate handlers to listen for or otherwise obtain gesture events and apply them to appropriate elements. Moreover, the gesture data described by gesture events fired to the elements may be pre-processed so that the gesture data is in a script format understandable by the application and is already transformed for corresponding target elements.

Having considered example procedures, consider now an example system that can be employed in one or more embodiments to implement aspects of instantiable gesture object techniques described herein.

Example System

Figure 6:
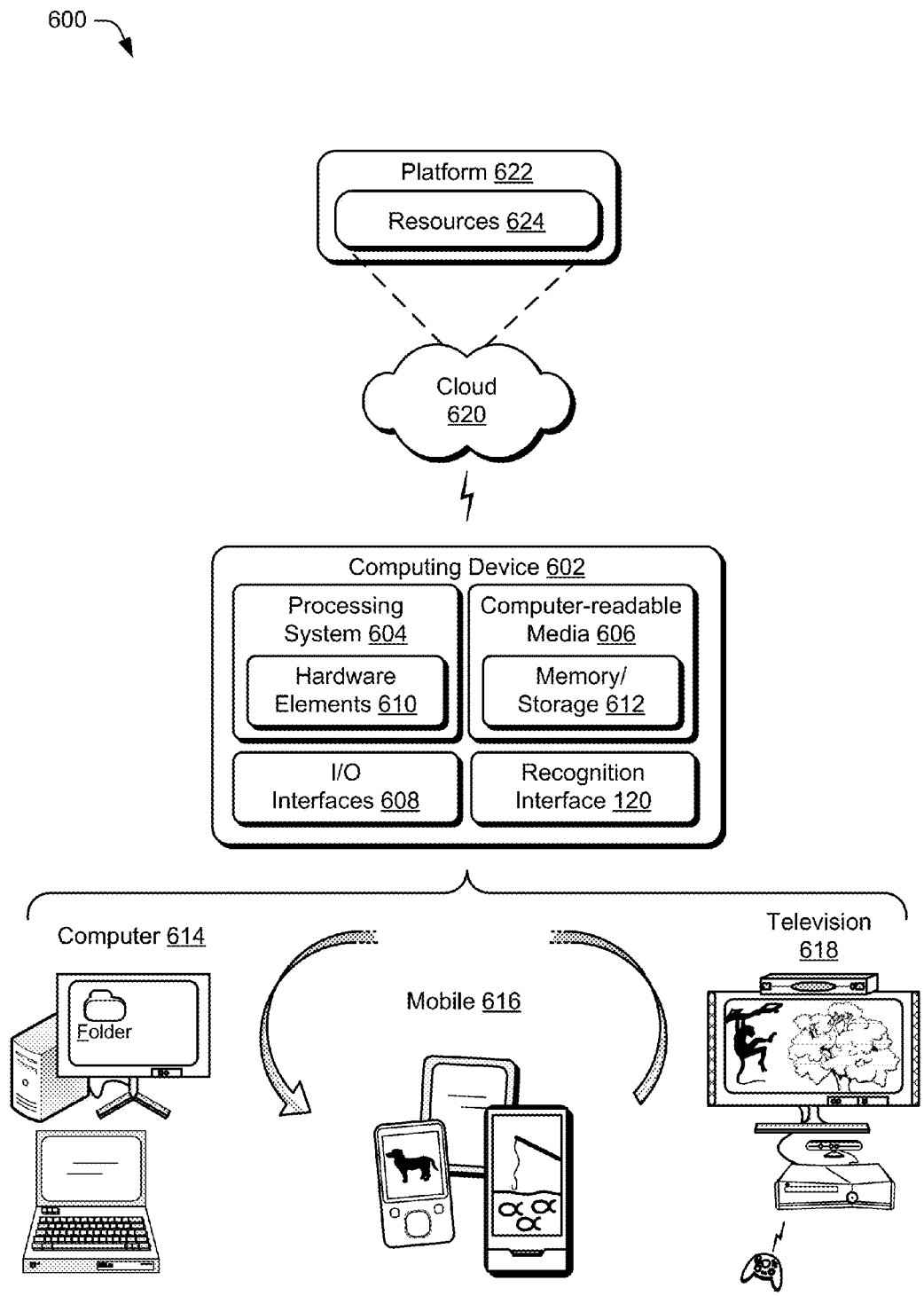
FIG. 6 illustrates various components of an example system that can be employed in one or more embodiments to implement aspects of the techniques described herein.

FIG. 6 illustrates an example system generally at 600 that includes an example computing device 602 that is representative of one or more computing systems and/or devices that may implement the various techniques described herein. The computing device 602 may be, for example, a server of a service provider, a device associated with the client (e.g., a client device), an on-chip system, and/or any other suitable computing device or computing system.

The example computing device 602 includes a processing system 604 that may incorporate one or more processors or processing devices, one or more computer-readable media 606 which may include one or more memory and/or storage components 608, and one or more input/output (I/O) interfaces 610 for input/output (I/O) devices. Computer-readable media 606 and/or one or more I/O devices may be included as part of, or alternatively may be coupled to, the computing device 602. As illustrated, the processing system 604 may also include one or more hardware elements 612 representative of functionality to implement at least some aspects of the procedures and techniques described herein in hardware. Although not shown, the computing device 602 may further include a system bus or data transfer system that couples the various components one to another. A system bus can include any one or combination of different bus structures, such as a memory bus or memory controller, a peripheral bus, a universal serial bus, and/or a processor or local bus that utilizes any of a variety of bus architectures.

The processing system 604, processors, and hardware elements 612 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. The memory/storage component 608 represents memory/storage capacity associated with one or more computer-readable media. The memory/storage component 608 may include volatile media (such as random access memory (RAM)) and/or nonvolatile media (such as read only memory (ROM), Flash memory, optical disks, magnetic disks, and so forth). The memory/storage component 608 may include fixed media (e.g., RAM, ROM, a fixed hard drive, etc.) as well as removable media (e.g., a Flash memory drive, a removable hard drive, an optical disk, and so forth).

Input/output interface(s) 610 allow a user to enter commands and information to computing device 602, and also allow information to be presented to the user and/or other components or devices using various input/output devices. Examples of input devices include a keyboard, a cursor control device (e.g., a mouse), a microphone for audio/voice input, a scanner, a camera, and so forth. Examples of output devices include a display device (e.g., a monitor or projector), speakers, a printer, a network card, and so forth.

Various techniques may be described herein in the general context of software, hardware, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processing systems, hardware elements, computer-readable media and/or memory/storage components.

An implementation of the described modules and techniques may be stored on or transmitted across some form of computer-readable media. The computer-readable media may include a variety of available medium or media that may be accessed by a computing device. By way of example, and not limitation, computer-readable media may include "computer-readable storage media" and "communication media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Communication media" may refer to a signal bearing medium that is configured to transmit instructions to the hardware of the computing device, such as via a network. Communication media typically may embody computer readable instructions, data structures, program modules, or other data in a modulated data signal, such as carrier waves, data signals, or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

Hardware elements 612 are representative of instructions, modules, programmable device logic and/or fixed device logic implemented in a hardware form that may be employed in some embodiments to implement at least some aspects of the described techniques. Hardware elements may include components of an integrated circuit or on-chip system, an application-specific integrated circuit (ASIC), a field-programmable gate array (FPGA), a complex programmable logic device (CPLD), and so forth. In this context, a hardware element may operate as a processing device that performs program tasks defined by instructions, modules, and/or logic embodied by the hardware element.

Combinations of the foregoing may also be employed to implement various techniques and modules described herein. Accordingly, software, hardware, or program modules, including the gesture module 114, rendering engine 116, recognition interface 120, applications 110, operating system 108 and other program modules, may be implemented as one or more instructions and/or logic embodied on some form of computer-readable media and/or by one or more hardware elements 612. The computing device 602 may be configured to implement particular instructions and/or functions corresponding to the software and/or hardware modules. The instructions and/or functions may be executable/operable by one or more articles of manufacture (for example, one or more computing devices 602 and/or processing systems 604) to implement techniques, modules, and example procedures for described herein.

As further illustrated in FIG. 6, the example system 600 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 600, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link. In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 602 may assume a variety of different configurations, such as for computer 614, mobile 616, and television 618 uses. Each of these configurations includes devices that may have generally different constructs and capabilities, and thus the computing device 602 may be configured according to one or more of the different device classes. For instance, the computing device 602 may be implemented as the computer 614 class of a device that includes a personal computer, desktop computer, a multi-screen computer, laptop computer, netbook, and so on.

The computing device 602 may also be implemented as the mobile 616 class of device that includes mobile devices, such as a mobile phone, portable music player, portable gaming device, a tablet computer, a multi-screen computer, and so on. The computing device 602 may also be implemented as the television 618 class of device that includes devices having or connected to generally larger screens in casual viewing environments. These devices include televisions, set-top boxes, gaming consoles, and so on. The techniques described herein may be supported by these various configurations of the computing device 602 and are not limited to the specific examples the techniques described herein. This is illustrated through inclusion of the recognition interface 120 on the computing device 602. Functionality of the recognition interface 120 and/or other applications/modules may also be implemented all or in part through use of a distributed system, such as over a "cloud" 620 via a platform 622.

The cloud 620 includes and/or is representative of a platform 622 for resources 624. The platform 622 abstracts underlying functionality of hardware (e.g., servers) and software resources of the cloud 620. The resources 624 may include applications and/or data that can be utilized while computer processing is executed on servers that are remote from the computing device 602. Resources 624 can also include services provided over the Internet and/or through a subscriber network, such as a cellular or Wi-Fi network.

The platform 622 may abstract resources and functions to connect the computing device 602 with other computing devices. The platform 622 may also serve to abstract scaling of resources to provide a corresponding level of scale to encountered demand for the resources 624 that are implemented via the platform 622. Accordingly, in an interconnected device embodiment, implementation of the functionality described herein may be distributed throughout the system 600. For example, the functionality may be implemented in part on the computing device 602 as well as via the platform 622 that abstracts the functionality of the cloud 620.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
instantiating a gesture object for an application to handle gesture recognition for the application through native gesture functionality provided by a computing device;
associating the gesture object with interaction inputs and a target element specified by the application such that the interaction inputs directed to the target element are offloaded to the gesture object configured for the application, the target element representing a selectable element rendered by the computing device;
creating a recognizer on behalf of the application to facilitate gesture recognition through the native gesture functionality provided by the computing device;
feeding interaction input data for the interaction inputs to the recognizer to enable recognition of gestures corresponding to the application based on the interaction input data;
obtaining gesture event messages from the recognizer that are indicative of recognized gestures for the application;
processing raw gesture data described by the gesture event messages on behalf of the application using the gesture object; and
firing gesture events having processed gesture data to the associated target element in accordance with a content model for the application such that the recognized gestures conveyed via the gesture event messages are applied to the target element.

2. A method as described in claim 1, wherein the gesture object is a script-based abstraction of underlying native gesture functionality provided by the computing device.

3. A method as described in claim 1, wherein the application is programmed using a dynamic scripting language.

4. A method as described in claim 1, wherein the method is performed via an interface exposed by a rendering engine employed by the application to render content for the application.

5. A method as described in claim 1, wherein the interaction inputs comprise touch contacts applied to a touchscreen associated with the computing device.

6. A method as described in claim 1, wherein the processing comprises transforming the raw gesture data to a coordinate space specified by the application.

7. A method as described in claim 1, wherein the recognizer is configured to track interaction inputs designated by the gesture object and map the interaction inputs to a library of supported gestures to recognize when particular gestures occur.

8. A method as described in claim 1, wherein the gesture object is configured to translate data for recognized gestures between a system format used by the recognizer and a script-based format understandable by the application.

9. A method as described in claim 1, wherein the interaction inputs are configured as pinning references to the gesture object that prevent the gesture object from collecting itself as long as the interaction inputs remain active.

10. A method as described in claim 1, wherein the gesture events fired to the target elements contain information that identifies the gesture object to enable continued access the gesture object when reference to the gesture object is lost.

11. A method as described in claim 1, wherein associating the target element with the gesture object causes gesture events generated in relation to the gesture object to be explicitly directed to the target element thereby enabling the application to directly apply the gesture events to the target element.

12. A computing device comprising:
a processing system;
a gesture module operable via the processing system to provide native gesture recognition functionality for the computing device, the native gesture recognition functionality representing gesture recognition functionality made accessible to applications via an operating system of the computing device; and
a recognition interface operable via the processing system to handle gesture recognition for applications that use dynamic scripting language; including:
registering the applications for gesture recognition with the gesture module via gesture objects that are instantiated to represent multiple interaction contexts, each gesture object configured to specify one or more interaction inputs and a target element of application content for a corresponding one of the multiple interaction contexts;
supplying input data for the interaction inputs to the gesture module for processing on behalf of the applications;
transforming raw gesture data obtained from the gesture module that provides the native functionality for recognized gestures into coordinate systems employed by target elements specified by the gesture objects; and
communicating the transformed gesture data for use by the applications to manipulate display of the target elements in accordance with the recognized gestures, the transformed gesture data being usable by the applications in the dynamic scripting language.

13. A computing device as described in claim 12, further comprising a rendering engine configured to render content for the applications, wherein the recognition interface is exposed to the applications via the rendering engine.

14. A computing device as described in claim 13, wherein the rendering engine is implemented as a component of a browser.

15. A computing device as described in claim 13, wherein the rendering engine is configured to parse the content for the applications to represent the content in accordance with a document object model (DOM), the target elements specifying a mapping of the gesture objects to particular elements in one or more DOMs representing the content.

16. A computing device as described in claim 12, wherein the interaction inputs specified for one or more of the gesture objects comprise inputs from a combination of multiple input sources.

17. A computing device as described in claim 12, wherein the recognition interface implements the gesture objects as a built-in object type that is exposed for use by applications that use dynamic scripting language.

18. One or more computer-readable storage media storing instructions that, when executed via a computing device, cause the computing device to implement an dynamically compiled application configured to perform operations including:
directing creation of a gesture object for a selected target element of content for the application to register for gesture detection via a script-based recognition interface exposed by a rendering engine of the computing device;
obtaining gesture events fired on the target element by the gesture object that are indicative of gestures recognized based upon user interaction with the target element;
tracking a state of the target element;

applying the gesture events to the target element to manipulate display of the target element in accordance with the recognized gestures; and updating the state of the target element based on the applying.

19. One or more computer-readable storage media as described in claim 18, wherein the directing creation of the gesture object comprises setting properties of the gesture object to specify the selected target element and one or more interaction inputs to be considered for recognition of gestures to apply to the selected target element.

20. One or more computer-readable storage media as described in claim 18, wherein the gesture object is configured to handle feeding of input data to a native gesture system of the computing device and processing of gesture data supplied back by the native gesture system on behalf of the application such that the processed gesture data is in a script format understandable by the application.

* * * * *